No. 610,169. Patented Sept. 6, 1898.
J. W. DEÜBNER.
WORKMAN'S TIME RECORDER.
(Application filed Sept. 28, 1896.)
(No Model.) 6 Sheets—Sheet 1.

Witnesses: Inventor:
John W. Deübner,
By Parkinson, Carter & Graves,
Atty

No. 610,169. Patented Sept. 6, 1898.
J. W. DEÜBNER.
WORKMAN'S TIME RECORDER.
(Application filed Sept. 28, 1896.)
(No Model.) 6 Sheets—Sheet 5.

Fig. 5.

Witnesses:
R. J. Jacker
W. D. Shafer.

Inventor:
John W. Deübner,
By Parkinson, Carter & Graves,
Attys.

No. 610,169. Patented Sept. 6, 1898.
J. W. DEÜBNER.
WORKMAN'S TIME RECORDER.
(Application filed Sept. 28, 1896.)

(No Model.)  6 Sheets—Sheet 6.

| | 1 | 2 | 3 | 4 | 5 | 6 |
|---|---|---|---|---|---|---|
| M-A.M. | 6.25 | 6.50 | 6.33 | 6.41 | 7.04 | 6.59 |
| M-A.M. | | 8.15 | | | | |
| M-A.M. | | 8.46 | | | | |
| M-A.M. | | | 11.05 | | | |
| M-A.M. | | | 11.15 | | | |
| M-P.M. | 12.05 | 12.05 | 12.04 | 12.03 | 12.04 | 12.05 |
| M-P.M. | 12.52 | 12.52 | 12.30 | 12.51 | 12.46 | 12.56 |
| M-P.M. | 6.03 | 6.02 | 6.09 | 6.09 | 6.08 | 6.08 |
| Tu.-A.M. | 6.50 | 6.42 | 6.52 | 6.59 | 6.57 | 6.55 |
| Tu.-P.M. | 12.02 | | | | | |

Witnesses:
W. J. Jacker
W. D. Shafer

Inventor:
John W. Deübner
By Parkinson, Carter & Graves
Attys.

UNITED STATES PATENT OFFICE.

JOHN W. DEÜBNER, OF CHICAGO, ILLINOIS, ASSIGNOR, BY DIRECT AND MESNE ASSIGNMENTS, TO THE CHICAGO TIME REGISTER COMPANY, OF SAME PLACE.

WORKMAN'S TIME-RECORDER.

SPECIFICATION forming part of Letters Patent No. 610,169, dated September 6, 1898.

Application filed September 28, 1896. Serial No. 607,198. (No model.)

*To all whom it may concern:*

Be it known that I, JOHN W. DEÜBNER, of Chicago, in the county of Cook and State of Illinois, have invented certain new and useful Improvements in Time - Recording Machines, of which the following is a specification.

This invention relates to improvements in time-recorders for recording the individual time of each of a plurality of employees or for any analogous use, and refers more specifically to a machine of that class in which each workman is allotted an individual key or operating device, the operation of which serves to record the time at which he begins and quits work, respectively.

Among the objects of the invention is to provide a machine of simple and practical construction which is capable of recording the time of individual workmen with great exactness (within a minute in the present embodiment of invention) and at the same time produce the record of the entire body of workmen in the form of a compact sheet, showing each individual's time in the form of a vertical column, from which the total time worked during either a day, a week, or a longer period may be "footed" or computed with the utmost facility and accuracy, which is arranged to automatically make the necessary changes not only to indicate the exact time of beginning and quitting work of each individual, but also to indicate over what part of the day, whether "A. M." or "P. M.," or both, the interval extended, as well as the day of the week upon which the work was done.

A further object of the invention is to provide such a construction that while the operation of the machine is positively controlled by a clock, yet the entire work of operating the machine is performed by an independent motor, thereby relieving the time-measuring mechanism of this work and avoiding the inevitable inaccuracy inherent to machines driven by clock mechanism which also serves to measure the time.

The invention consists in the matters hereinafter described, and more particularly pointed out in the appended claims, and will be more readily understood by reference to the accompanying drawings, in which—

Fig. 7 is an enlarged detail view of one of the type-wheels and a coöperating type-bar, said parts being shown in top plan.

Referring to said drawings, A designates as a whole the outer casing (best shown in Figs. 1 and 2) having a general rectangular form and provided at its front upper corner with an angular inset or rabbet extending transversely of the casing and within which the bank of keys is located, as hereinafter described. The outer casing consists generally of rigid bottom and back walls $a\ a'$, respectively, which may conveniently be of cast metal or wood, as preferred, and to these are connected sheet-metal end, top, and front walls $a^2$, $a^3$, and $a^4$, respectively. The front wall $a^4$ is divided across the entire width of the casing on a horizontal line midway of its height, the upper part thereof, $a^5$, being hinged to the lower, as indicated at $a^6$, to form a door, the upper edge of which, $a^7$, fits against or within the immovable upper part $a^8$ of the front wall at the inner angle of the key-bank recess. The door $a^5$ will preferably be provided with a suitable lock to prevent tampering with the machine by unauthorized persons. Within each end of the outer casing thus constructed is arranged a cast-metal end frame member B. (Best shown in Figs. 3, 4, and 5.) These frame members are desirably made of skeleton form, as shown, the various bars being made of considerable thickness, so as to afford proper bearing for the several shafts journaled therein and parts mounted thereon, and in order to further reduce weight and economize in material each of the bars is shown as channeled out on its exterior surface. A third inner frame member B' is arranged to rest directly upon the bottom $a$ and is united at its ends with the side frame members B.

In a machine embodying the present invention two sets of movable characters or printing devices are employed, one set having printing characters designating the hours and the other set having characters corresponding to the minutes or fractions of hours. Furthermore, one of said sets is made movable in a rotary or oscillatory direction, while the other is made movable in rectilinear directions. The printing devices of said sets are arranged in pairs, a rotary member and a reciprocating member being arranged side by side adjacent to each other alternately across the machine, each pair constituting an individual set, and from the various combinations presented at a determined printing-point and produced by a differentiated rate of movement of the two sets impressions are taken from time to time by the several individual impressing devices, as will be hereinafter more fully described.

First describing the set of rotary printing devices, which in the present instance carry or are provided with the minute or fractional parts of hours characters, C designates a shaft (see Fig. 5) journaled transversely in the end frame members B, so as to extend from side to side of the machine. Upon this shaft are rigidly mounted or splined side by side a plurality of type-wheels C', equal in number to the number of individual recording sets. The type-wheels are spaced at regular intervals apart, the distance between each two being in the present instance somewhat greater than the peripheral-face width or printing-surfaces of the wheels, and in order to hold said wheels in this relation each is conveniently provided at one side with a hub $c$, which serves as a spacing-sleeve. Each type-wheel is provided on its peripheral face with characters $c'$, corresponding to the divisions of the hour, in the present case corresponding to minute divisions, the complete series therefore consisting of sixty divisions running from "00" to "59," inclusive.

Figure 2:
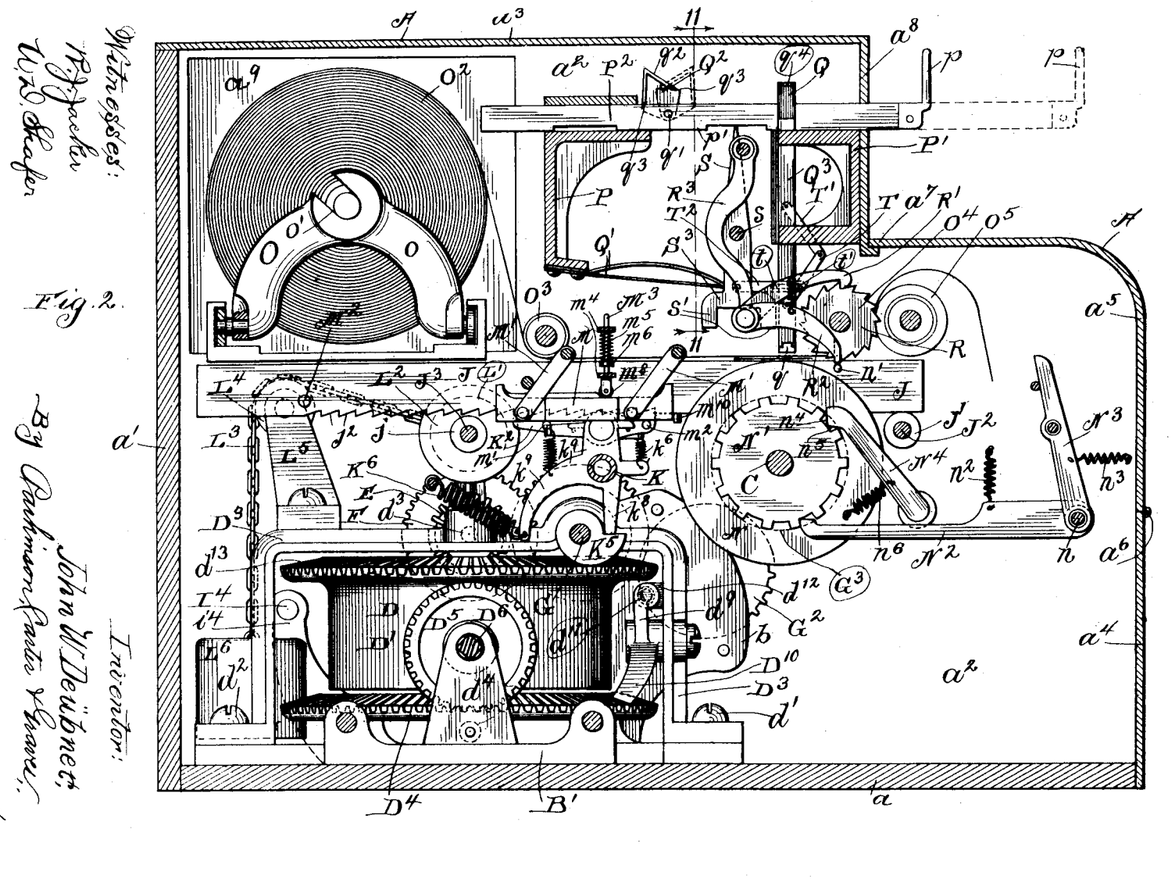
Fig. 2 is a longitudinal vertical section taken immediately inside of the end frame-piece toward the observer and showing the parts having bearing in said piece in section.
Figure 4:
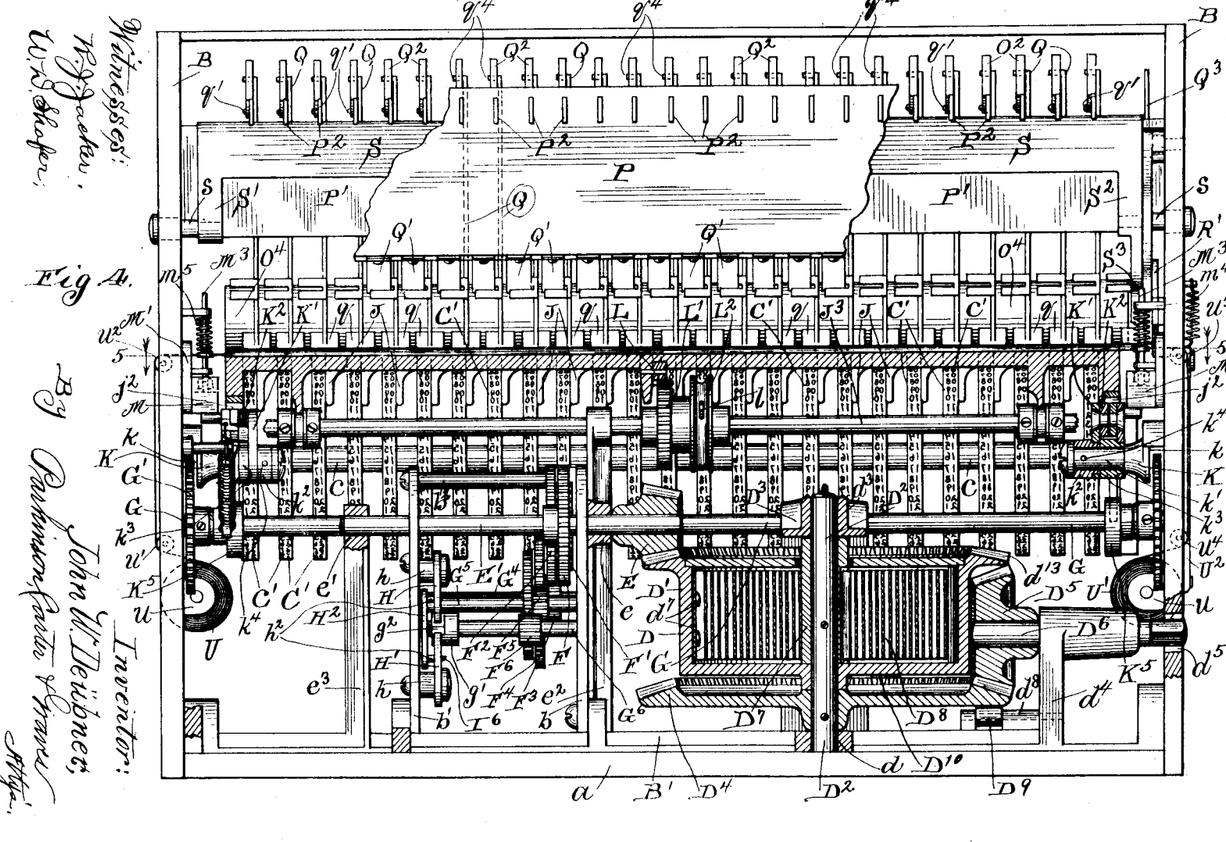
Fig. 4 is a transverse vertical section taken on line 4 4 of Fig. 5 and looking in the direction of the arrows or toward the front of the machine.
Figure 5:
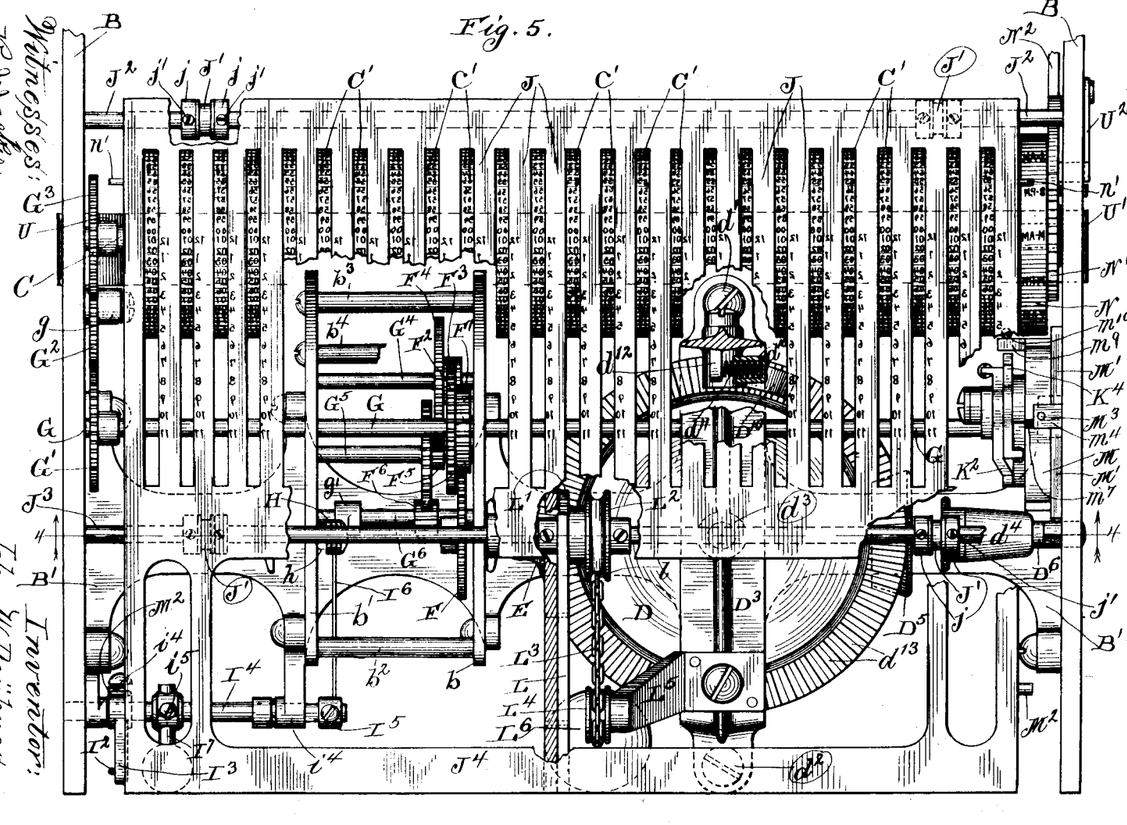
Fig. 5 is a horizontal sectional view taken on line 5 5 of Fig. 4, showing the type-bars and type-wheels in plan, parts of the mechanism being broken out to expose subjacent parts.

The set of minute-wheels is moved forward or rotated a step at a time at the end of each minute by means of clock-controlled mechanism, so as to present the proper characters corresponding to the time of day at a determined printing-point, (in the present instance a point vertically above the axis of the wheel,) which mechanism embraces a clock which operates a trip or release and a spring-motor which performs the work of moving the mechanism and is controlled by the release or escapement. Said parts are constructed and arranged as follows:

D, Figs. 2, 4, and 5, designates a spring-motor, comprising a cylindric barrel D', provided with a vertical axially-arranged spindle $D^2$, which is journaled at its lower end in a suitable bearing-aperture $d$, provided in the bottom frame B' of the machine, and is held in vertical position and supported at its upper end by means of a U-shaped yoke or cast-metal strap $D^3$, which is bolted at its ends to the bottom frame member at front and rear of the barrel D', as indicated at $d'$ $d^2$, Figs. 2 and 5, the central part of the yoke being arranged to overlie and extend axially across the upper end of the said barrel and being provided with a suitable bearing-aperture $d^3$, which receives the upper end of the said spindle.

$D^4$ designates a miter-gear mounted rigidly upon the spindle $D^2$ between the lower end of the barrel and the bottom frame member, and $D^5$ designates a winding-gear arranged to intermesh with the miter-gear mounted upon a key-shaft $D^6$, which is journaled horizontally in the upper end of a standard or bracket $d^4$, rising from the bottom frame member B'. The end of the key-shaft remote from the winding-gear is squared or otherwise formed for engagement with a winding-key and is arranged to extend outwardly through a keyhole $d^5$, formed in the side frame member B, so as to be accessible for winding.

The motor-drum is mounted loosely upon the spindle, and in order to hold said drum in proper operative position thereon and at the same time to afford means for connecting one end of the motor-spring with said spindle a sleeve $D^7$ is rigidly mounted upon the spindle within the drum, having on one side a longitudinal slot $d^6$, (see Fig. 4,) within which is inserted the right-angled bent end of the motor-spring $D^8$, the lower end of the sleeve serving to confine the drum in proper position on the spindle. The opposite end of the motor-spring, which is of the usual coiled watch-spring type and is of a width approximately equal to the depth of the drum, is attached to the inner cylindric surface of the drum by means of studs or buttons $d^7$.

In order to hold the miter-gear $D^4$ in mesh with the winding-gear and to relieve said miter-gear from bending strain incident to the lateral thrust due to the bevel of the intermeshing gear-teeth, a guide-roller $D^9$ is mounted in a suitable bearing $d^8$ in contact with the lower surface of the periphery of the miter-gear and axially beneath the winding-gear $D^5$.

Obviously with the above construction when the key-shaft is rotated in the proper direction if the winding-drum be held stationary the miter-gear will rotate the spindle and thereby wind up the spring, and in order to hold the miter-gear from turning back under the influence of the spring a pawl $D^{10}$ is pivotally mounted upon one of the uprights of the yoke $D^3$ (see Fig. 2) in position to engage the gear-teeth of the miter-wheel, said pawl being provided with an upturned arm $d^9$, having a recess $d^{10}$ in its upper end, within which is arranged a coiled spring $d^{11}$, (see Fig. 5,) the projecting end of which is arranged to act against a lug $d^{12}$ on the yoke-standard, so as to hold the pawl in yielding engagement with said gear-teeth.

The upper periphery of the motor-drum is provided with gear-teeth $d^{13}$, with which is arranged to intermesh a bevel driving-gear E, mounted rigidly upon a shaft $E'$, which extends from the winding-drum transversely through journal-bearings $e$ $e'$, formed in standards $e^2$ $e^3$, respectively, which rise from the bottom frame-piece.

Next describing the train of gears by means of which motion transmitted to the shaft $E'$ by the motor is communicated to the type-wheels, F designates a spur-gear mounted upon the shaft $E'$ and arranged to intermesh with a second spur-gear $F'$, mounted upon a counter-shaft G, which extends transversely from side to side of the machine parallel with and in front of the shaft $E'$ and is journaled at its ends in suitable bearings in the side frame members B. Upon the shaft G, adjacent to one of the side frame members B, is rigidly mounted a second spur-wheel $G'$, which latter intermeshes with an idle-gear $G^2$, mounted on a bearing-stud $g$, projecting from the inner face of the side frame member, and which in turn communicates motion to a gear $G^3$, mounted rigidly upon the end of the type-wheel shaft C, all of the gears $G'$ $G^2$ $G^3$ being of uniform diameter.

Inasmuch as the shaft G makes but a fractional part of a revolution at each step of the machine a multiplying train of gears is employed which communicates movement from said shaft G to an escapement-shaft which is arranged to make a single complete revolution for each escapement or step of the machine. Describing said parts, $F^2$ designates a third spur-gear mounted on the shaft G adjacent to the gear $F'$ and arranged to intermesh with a small gear or pinion $F^3$, mounted upon a short counter-shaft $G^4$, located below and slightly forward of the shaft G, the ends of said counter-shaft $G^4$ being journaled in two parallel vertical frame-plates $b$ $b'$, which are secured at their lower edges to the bottom frame member and held rigid and parallel with each other by means of spacing-rods $b^2$ $b^3$ $b^4$. The shaft $G^4$ is in turn provided with a larger gear $F^4$, which is arranged to intermesh with a pinion $F^5$, mounted upon a third counter-shaft $G^5$, which also carries a larger gear arranged to intermesh with a pinion $F^6$, mounted upon the release escapement-shaft $G^6$, the relative sizes of the several members of the train of gears being such that when the escapement-shaft performs one revolution the type-wheel shaft will be rotated but one-sixtieth part of a revolution or from one minute character to the next.

Figure 3:
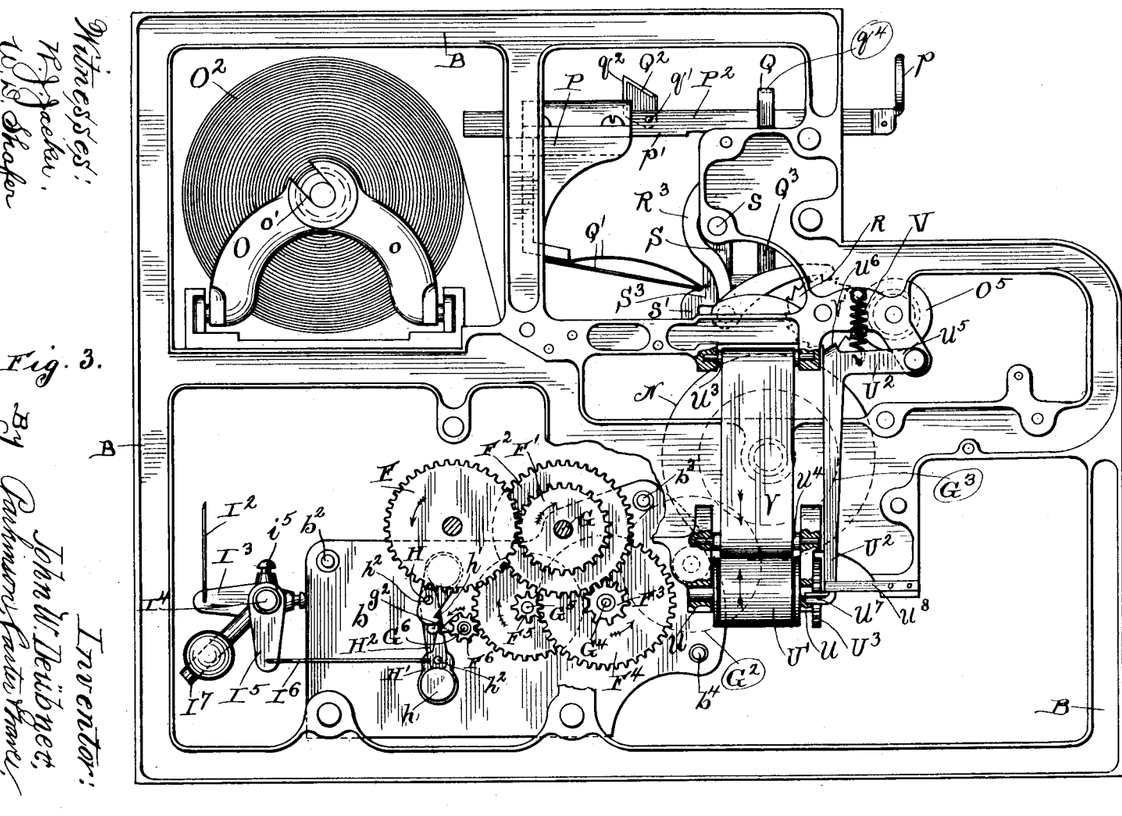
Fig. 3 is a side elevation of the end frame-piece next the observer, (the sheet-metal casing being removed,) parts being broken away and parts of the mechanism removed to expose the arrangement of other mechanism within, the view showing particularly the arrangement of the train of driving-gear.

Referring now to Figs. 3 and 5, $g'$ designates a collar mounted rigidly upon the release-shaft and provided with a radially-projecting lug or trip $g^2$. H H' designate escapement-levers pivotally supported upon pivot-studs $h$, located upon the inner face of the frame-plate $b'$ at points above and below the escapement-shaft, respectively, the free ends of said escapement-levers being arranged to project toward each other and adjacent to the path of revolution of the trip $g^2$. The upper escapement-lever is provided on its end with a detent notch or hook $h'$, adapted to engage and hold the end of the trip $g^2$ when oscillated into the path of the latter, while the upper end of the escapement-lever H' is likewise suitably formed to act as a detent to engage and hold the trip when thrown within its path. Normally the trip $g^2$ will rest in contact with the upper end of the escapement-lever H', and thereby hold the motor from moving the mechanism forward, and in order that the escapement-lever H may be thrown into the path of the trip simultaneously with the withdrawal of the escapement-lever H' said levers are interconnected by means of an oscillatory link or lever $H^2$, pivotally mounted upon the frame-plate $b'$ at a point midway between the ends of the two escapement-levers and engaged at each of its ends with one of the said levers by means of pivot-studs $h^2$ $h^2$. Obviously with this arrangement the movement of either escapement-lever in one direction will result in a movement of the other in an opposite direction, or, in other words, when the lower escapement-lever is withdrawn and the trip released the upper escapement-lever will be projected into the path of the trip in position to catch the latter as it goes around on its first revolution. In order to lessen the frictional resistance between the trip-arm and the end of the escapement-lever upon which it normally rests, the supporting end is beveled in a direction to facilitate the withdrawal of the lever, as shown clearly in the drawings.

Figures 1, 10:
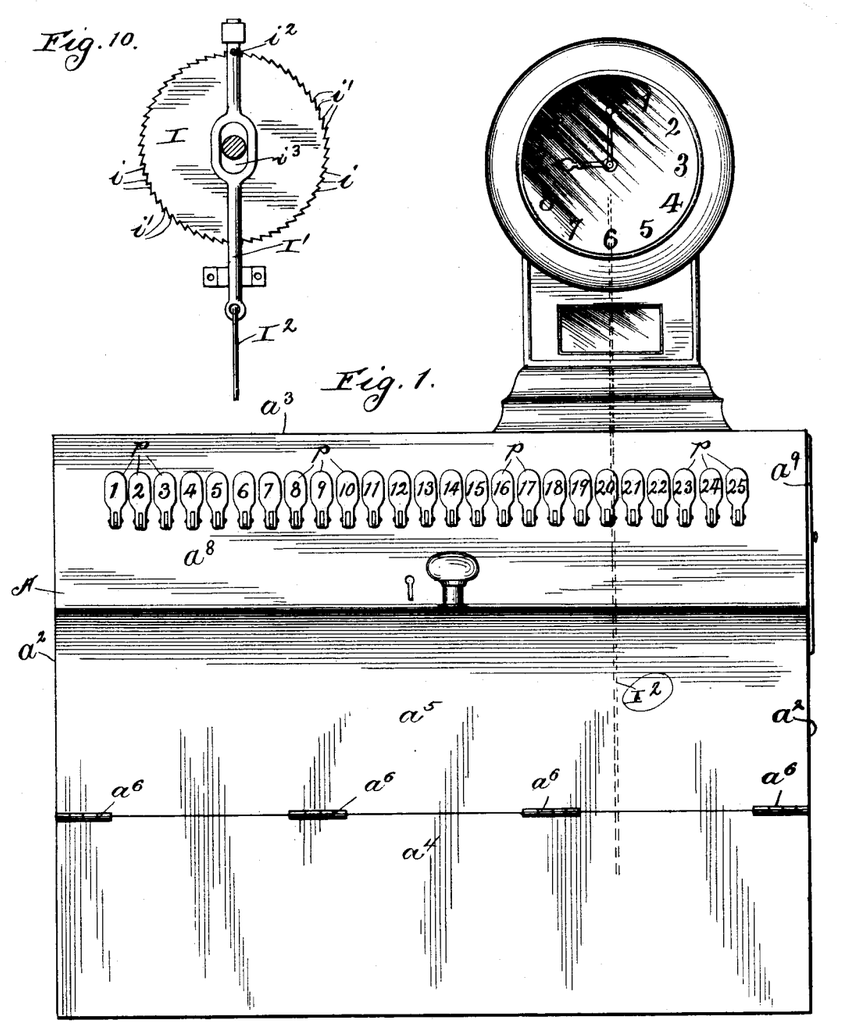
Figure 1 is a front end elevation of a machine embodying my invention.
Fig. 10 is a fragmentary detail, in rear elevation, of the trip - operating cam - wheel mounted upon the minute-hand spindle of the clock.

In order to operate the trip or release, a clock is provided, in the present instance mounted at the top of the machine outside of the casing and near the back side thereof, as shown in Fig. 1. Upon the minute-hand shaft of the clock is mounted a cam-wheel I, (see detail, Fig. 10,) provided at its periphery with a series of spirally-arranged cams $i$, joined with each other by intermediate abrupt radially-arranged portions $i'$.

I' designates an actuating-rod arranged to extend diametrically across the cam-wheel I, adjacent to the latter, in the present instance vertically, and provided at its upper end with a cam-stud, preferably a roller $i^2$, arranged to project at right angles from said actuating-rod to engage the upper periphery of the cam-wheel. The actuating-rod is provided with a longitudinal yoke-slot $i^3$, which embraces the minute-wheel shaft, and said rod is also arranged to extend through a suitable guide mounted upon the clock-frame at a point below the periphery of the cam-wheel, which serves to hold the rod from movement laterally, but permits it to reciprocate vertically. A connecting rod or wire $I^2$ extends from the lower end of the actuating-rod I' down to and is connected with an arm $I^3$ upon a shaft $I^4$, mounted in suitable bearings $I^4$, so as to extend parallel with the release-shaft and a short distance in rear of the latter. The shaft $I^4$ is provided with a second arm $I^5$, arranged at right angles to the arm $I^3$ and located immediately in rear of the lower escapement-lever, which latter is connected with said cam by means of a link or rod $I^6$. In order to insure the prompt return of the escapement-levers to their normal position when permitted by the further rotation of the cam-wheel, the shaft $I^4$ is provided with an adjustable radially-projecting arm $I^7$, which is weighted at its outer end, the arrangement being such that the weighted arm may be fixed by means of a set-screw $i^5$ in a position more or less nearly approaching the horizontal.

To next describe the reciprocatory printing devices which, as hereinbefore mentioned, are arranged to alternate with the type-wheels and are provided with the characters designating the hours, J designates a plurality of type-bars arranged in a horizontal plane, so as to extend longitudinally of the machine, preferably, and as herein shown, cast integral and united with each other at their front and rear end portions. The type-bars are supported so as to rest and travel with their upper surfaces flush with or in the same plane with the upper periphery of the type-wheels, each bar being arranged to pass between a pair of type-wheels by means of rollers J', mounted to rotate upon supporting-shafts $J^2$ $J^3$, arranged to extend transversely of the machine at a suitable distance apart and seated at their ends in the side frame B, one of the type-bars near each side of the gang being of such vertical width as to depend somewhat below the remaining bars and being provided at its lower edge with a rail-surface, which is adapted to engage the grooved rollers J'. The latter are conveniently, and as herein shown, held in proper alinement with each other and at fixed points upon the shafts $J^2$ $J^3$ by means of collars $j$, provided with set-screws $j'$. In order to afford support for the rear end of the type-bars when the latter are moved forward, those key-bars which act as supporting-rails are extended rearwardly a distance beyond the shaft $J^3$ equal to the length of travel of the type-bars, and preferably, and as shown in the present instance, the rear ends thereof are united by a transverse strengthening rib or bar $J^4$. Each type-bar J is provided on its upper surface with a series of printing characters running from "1" to "12" consecutively, spaced at equal distances apart and in transverse alinement, as indicated clearly in Fig. 5, the numerals "12" being so located as to stand vertically above the axis of the type-wheel shaft C when the type-bars are in their rearmost position.

Figures 6, 11:
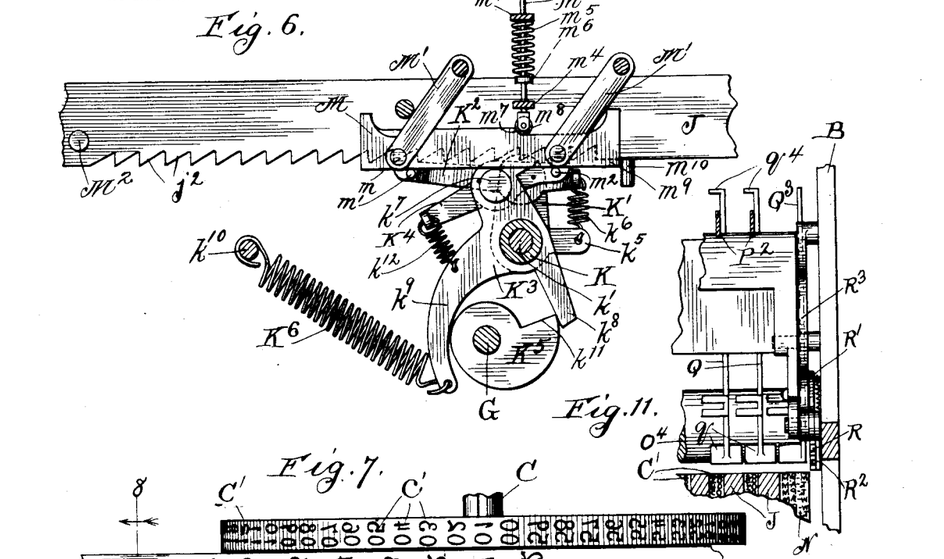
Fig. 6 is a fragmentary enlarged detail of the key-bar-actuating mechanism, the latter being shown in side elevation.
Fig. 11 is a transverse vertical sectional view taken on line 11 11 of Fig. 2.

The set of type-wheels are moved forward a step at a time, so as to present different characters at the end of each hour, and actuating devices for thus moving the bars driven from the shaft G are constructed and arranged as follows:

The outermost type-bar at each side of the machine is provided on its under surface with a series of ratchet-teeth $j^2$, (see Figs. 2 and 6,) spaced at a distance apart equal to the distance between adjacent groups of printing characters.

K designates pivot studs or brackets, mounted one upon each side frame member B at a point between the shaft G and the under surface of the subjacent type-bar, each bracket being undercut at the under side of its base, as indicated at $k$, so as to avoid interfering with the periphery of the gear G' and at the same time permit the axis of the pivot-stud $k'$ to be located in a plane approximately midway between the lower surface of the type-bars and the said shaft G. Upon each bracket-stud K (see Fig. 4) are mounted two sleeve-sections $k^2$ $k^3$, the outer one of which, $k^2$, is made rigid with the stud by means of a through-pin $k^4$. Upon the rigid sleeve is mounted a standard K', made immovable with the sleeve and carrying at its upper end a pivot-stud, upon which is mounted a rearwardly-projecting detent or holding-pawl $K^2$, which engages the series of ratchet-teeth $j^2$. In order to hold the holding-pawl in yielding engagement with the ratchet-bar, the standard K' is provided with a forwardly-projecting arm $k^5$, with which is connected the lower end of a coiled contractile spring $k'$, secured at its opposite end to the forwardly-projecting end of the holding-pawl.

$K^3$ designates an actuating-lever connected at a point between its ends with the loose sleeve and provided at its upper end with a pivot-stud $k^7$, upon which is mounted an actuating-pawl $K^4$, the acting end of which projects forwardly or in a direction opposite to that of the holding-pawl. The lower part of the actuating-lever is made yoke-shaped or provided with two depending arms, one of which, $k^8$, serves as a wiper, which is acted upon by a snail-cam $K^5$, mounted upon the shaft G, while the other, $k^9$, serves as a lever-arm, with the lower end of which is connected one end of a relatively strong contractile spring $K^6$, arranged to act in opposition to the cam $K^5$, the opposite end of said spring being attached to a stud $k^{10}$, located upon the side frame in rear of and somewhat above the lower end of the lever-arm.

As hereinbefore mentioned, the movement of the shaft G is one-sixtieth part of a revolution at the end of each minute at each step, and it follows, therefore, that the snail-cam will be rotated a complete revolution once each hour. Obviously when the abrupt radially-extending portion or drop $k^{11}$ reaches the proper position the spring $K^6$, which is of sufficient strength to move the gang of type-bars forward, will suddenly oscillate the actuating-lever and the actuating-pawl carried thereby, so as to move the type-bars forward a single notch, the holding-pawl meantime entering a succeeding notch, so as to hold the type-bars, while the actuating-lever is again gradually oscillated to retract the actuating-pawl by the rotating movement of the snail-cam. The actuating-pawl is held in yielding engagement with the ratchet-teeth by means of a contractile spring $k^{12}$, connected with the rear end of said pawl and with the lever-arm $k^9$.

In order to return the gang of type-bars to its rearmost position when the ratchets are thrown off and said bars released by the mechanism now about to be described, one of the type-bars—in the present instance one located near the center of the machine—is provided on one side with a longitudinally-extending rack L, (see section Fig. 4,) which is arranged to intermesh with a spur-gear L′, mounted rigidly upon the shaft $J^3$, and adjacent to the gear L′ and connected so as to move therewith is mounted a grooved pulley $L^2$, provided in its periphery with a hook or eye-lug $l$, with which is connected a cable, herein shown as consisting of a chain $L^3$. The chain $L^3$ extends rearwardly over a guide-pulley $L^4$, mounted upon the upper end of a bracket $L^5$, carried by yoke $D^3$, and carries upon its depending end a weight $L^6$. The eye-lug $l$ is so located upon the periphery of the winding-pulley $L^2$ as to assume a position in a right line between the axis of the shaft $J^3$ and the guiding-periphery of the guide-pulley $L^4$ when the set of type-bars has been fully retracted and the chain unwound, and this arrangement will obviously serve as a sufficient stop for arresting the rearward travel of the set of type-bars.

To now describe the mechanism whereby the pair of pawls are automatically thrown off and the set of type-bars released upon the twelfth step or forward movement of the latter, so that at the end of the twelfth hour the machine will automatically begin at the numeral designating the hour of twelve again, M designates presser-bars, supported from the inner side of the frame B at each side of the machine by means of pairs of parallel links M′ in such position as to hang parallel with the type-bars and each with its lower straight edge $m$ located slightly below the points of the set of ratchet-teeth and in position to engage with stop-studs $m'$ $m^2$, projecting laterally from the acting end of each of the pawls. The links M′ are of equal length and are so arranged that when the pawls are in operative position they will extend from their points of attachment with the presser-bar obliquely, forwardly, and upwardly to their points of attachment with the side frame, so that if the presser-bar be moved forwardly it will also move downwardly upon the arc described by the radius of the links, being held at all times in parallel relation to the type-bars, and thereby forcing the pawls simultaneously out of engagement with the ratchet. In order to thus move the presser-bar forward, so as to throw the pawls off, the adjacent type-bar is provided with a tappet-stud $M^2$, located in rear of the rear end of the presser-bar a distance when the type-bars are in their rearmost position equal to that occupied by eleven ratchet-notches, so that upon the twelfth step of the type-bars the presser-bar will be engaged and thrust forward by the tappet-stud. In order that the presser-bar may, after throwing the pawls off, be held down in position to hold the pawls out of engagement with the ratchets during the time the type-bars are running back, notwithstanding the tappet-stud is carried back with the latter, a plunger $M^3$ is mounted in suitable bearings $m^4$ on the frame member B and arranged to press at its lower end vertically downward upon the upper surface of the presser-bar by means of a coiled spring $m^5$, interposed between the uppermost bearing $m^4$ and a collet $m^6$ upon the lower part of said plunger. The strength of the spring $m^5$ is sufficient to overcome the upward thrust of the pawl-springs and throw the presser-bar downward until its supporting-links assume a vertical position, and in order to prevent said spring $m^5$ from throwing the presser-bar downward before it has been moved forward by the tappet-stud the upper surface of the presser-bar is provided with an oblique shoulder $m^7$, located immediately in rear of the acting end of the plunger when the presser-bar is in its normal rearmost position, which shoulder is arranged at such an incline that the plunger must be retracted or raised slightly in the initial forward movement of said bar. Obviously when thus formed the spring $m^5$ will have no tendency to throw the presser-bar downward until after the latter has been moved forward positively by the tappet-stud sufficiently to carry the shoulder past the end of the plunger, whereupon the plunger-spring will act to carry the presser-bar down to a position in which the standing links will assume a vertical. Preferably, and as herein shown, the acting end of the plunger will be provided with a small antifriction-roller $m^8$. The presser-bar is returned to its normal position by means of a stud $m^{10}$ upon the under surface of the type-bar, which engages a part $m^9$ of the presser-bar arranged to project beneath the type-bar in the backward movement of the latter.

In a machine of the character being described, in which the series of hours runs from one to twelve only, it is obviously desirable that the record show whether the work was performed during the antemeridian or postmeridian period or partly in each and also on what day of the week. To this end, therefore, mechanism is provided, for convenience hereinafter designated "dating" mechanism, arranged to automatically change the position of a type-wheel, so as to cause it to print the proper characters "A. M." or "P. M." and the proper day of the week laterally opposite the time record. Describing said mechanism, N designates a date-wheel mounted loosely upon the type-wheel shaft at one side of the set of type-bars and between the latter and the side frame B, said date-wheel being of the same diameter as the type-wheels. The date-wheel is provided upon its periphery with fourteen groups of characters, each group comprising the characters "A. M." or "P. M." and the abbreviation for the day of the week. Inasmuch as the position of the date-wheel is changed every twelve hours, the characters "A. M." and "P. M." are alternated around the wheel, while the abbreviations of the days of the week are arranged in pairs, so as to designate the forenoon and afternoon of each day. Secured concentrically at one side of the date-wheel—in this instance the outer side—is a ratchet-wheel N', provided with a series of fourteen ratchet-notches, equal in number to the number of groups of characters upon the periphery of the wheel—i. e., two notches for each day of the week. The ratchet-wheel is operated upon by one end of an actuating-pawl $N^2$, pivotally connected at its opposite end $n$ with the lower end of an oscillatory lever $N^3$, the upper end of which is arranged to project upward in position to be engaged by a tappet-stud $n'$, mounted upon the type-bar J, the position of this stud being such that upon the twelfth forward movement of the set of type-bars the tappet-stud will engage and move the end of the oscillatory lever, and thereby actuate the pawl $N^2$. The said pawl is held in yielding engagement with the lower periphery of the ratchet-wheel by means of a coiled spring $n^2$, attached thereto and to a stud upon the side frame B, and is retracted by means of a second coiled spring $n^3$, similarly mounted upon the side frame and arranged to act upon the lower part of the oscillatory lever $N^3$. In order to hold the date-wheel from turning backward during the retraction of the actuating-pawl and also to bring its characters into correct registry with the impression devices, a detent $N^4$ is arranged to act upon the upper periphery of the ratchet-wheel, the acting end of said detent being V-shaped, so that the two inclined surfaces $n^4$ $n^5$ thereof will act as cams upon the opposing side walls of the ratchet-notches to bring the date-wheel invariably to a proper registering position. The detent is held yieldingly in engagement with the date-wheel by means of a contractile spring $n^6$, also suitably attached to the side frame member.

It will be obvious that with the construction shown the characters presented at the printing-point will be changed automatically at the end of each twelve hours.

It is to be understood that the arrangement of the impression devices and the mechanism for supporting and moving the recording sheet or web is not necessarily limited to that now to be described; but as a practical and preferred construction said mechanism is herein shown as follows:

Within the rear upper part of the casing is arranged a carriage O, mounted to slide transversely on suitable horizontal parallel ways, which latter are secured at their ends to the side members B, as indicated most clearly in Fig. 3. The carriage O comprises at each end an arch $o$, which is provided at its upper side with a trunnion-bearing $o'$, adapted to receive the trunnions of a paper-roll $O^2$. In the construction herein shown the outer casing is provided with a door $a^9$, through which the paper-roll and carriage upon which the latter is mounted may be conveniently removed or inserted endwise. From the roll $O^2$ the web of paper is carried forwardly beneath a guide-roll $O^3$, journaled transversely between the side frames closely adjacent to and parallel with the type-bars, from thence beneath a feed-roll $O^4$, located in the same plane with the roll $O^3$ and at a point somewhat in advance of the printing-point of the type-wheels, and upwardly beneath the feed-wheel and a presser-roll $O^5$, arranged in front of the latter, the feed-roll being covered with rubber, so as to insure proper frictional engagement with the web. After passing between the feed and presser rolls the recording-sheet is allowed to coil itself in the front part of the casing, as indicated in Fig. 2, it being understood that the paper will be severed in the form of rectangular sheets from time to time.

The individual impressing devices are arranged in a transverse row above the printing-points of the type, and in the present embodiment the initial record made when the workman commences work is made by moving an actuating-key in one direction, while the final record made at the end of the interval is effected by the movement of the key in an opposite direction. In order that the several records of the workman may be made at any time, either initially or finally, without by any possibility printing twice at the same place upon the sheet and at the same time the records of the body of workmen produced as nearly in transverse columns as possible, mechanism is arranged for feeding forward the recording sheet upon each alternate actuation of any one of the entire set of actuating-keys, but not upon the actuation of any succeeding pair of keys in the same direction. Describing said mechanism, P P' designate two transversely-extending frame-bars, mounted to extend from side to side of the machine at the upper front part thereof, and P² designate key-bars mounted to slide horizontally longitudinally of the machine in suitable bearings formed in the frame-bars P P', the front end of each key-bar being arranged to project outwardly through a suitable opening in the front portion $a^8$ of the casing into the key-bank recesses, as indicated clearly in Fig. 2, and being provided at its outer end with an upstanding finger-piece $p$.

Q designates impressing devices or plungers mounted to slide vertically in suitable guides formed in the frame-bar P' adjacent to each key-bar, the lower end of each impressing device being provided with a plate or impressing-surface $q$, of rubber or the like, of suitable width and conformation to act simultaneously upon a single type-bar and its adjacent type-wheel when the plunger is depressed.

Q' designate plate-springs secured to the under surface of the frame-piece P, and each arranged to project forwardly and engage at its movable end with a suitable notch formed in the rear side of the plunger, the arrangement of said springs being such as to hold the plunger normally in a position adjacent to but free from the recording-sheet. In order to raise said plungers Q against the action of their several springs, each key-bar is provided with a loosely-pivoted reversible cam-block $Q^2$ of triangular form. The lower end of each cam-block is pivoted upon the side of the key-bar remote from its plunger by means of a pivot-stud $q'$. The upper part of the cam is provided with a marginal flange portion $q^2$, arranged to overhang the upper edge of the key-bar, each of said flange portions terminating at its lower end in a shoulder $q^3$. Said shoulders are so located that when the cam is tilted rearwardly the rearmost shoulder will rest in engagement with the upper edge of the key-bar and hold the opposing cam-surface $q^2$ in an obliquely-upward and rearwardly-extending position, and, conversely, when the cam-block is tilted forward the opposite shoulder will engage the upper edge of the key-bar and hold the opposite cam-surface $q^2$ in an obliquely-upward and forwardly-extending position, as indicated in dotted lines in said Fig. 2. The upper end of each plunger is provided with a right-angled arm $q^4$, (see Fig. 4,) which is arranged to overhang the key-bar and is adapted to coöperate with the reversible cam-block to elevate the plunger each time the key-bar is shifted in either direction, the inclined surface acting to elevate the plunger and the opposite surface forming a perpendicular drop, which permits the spring to throw the plunger down unrestrictedly.

In order to afford a better action in the springs Q', each of said springs is shown as consisting of two leaves, the lower one of which is made straight and the upper one arched or bowed, so as to act upon the lower leaf at a point adjacent to the plunger, the lower one only being connected with the latter.

In order to actuate the feed-roller, the latter is provided at one end with a ratchet-wheel R, which is acted upon by a pair of pawls R' R², arranged to both act in the same direction and both pivotally mounted upon the lower end of a swinging arm $R^3$, which is attached at its upper end to the side frame of the machine—that is to say, the arrangement is such that one pawl will act upon the forward oscillation of the swinging arm to rotate the feed-roll a step and the other will act upon the return movement of said arm to rotate the feed-roll in the same direction. In order to oscillate the arm $R^3$ each time any one of the key-bars is moved in a direction the opposite of the direction of movement of the last preceding key-bar operated, a rocking bar S (see Figs. 2 and 4) is arranged to extend transversely of the machine the entire width of the printing devices and is provided at each end with a depending part S' S², with which are engaged trunnion-studs $s$, arranged in axial alinement with each other and having bearing in the side frame B. The upper edge of the rocking bar is made thin or web-shaped, coming to a blunt knife-edge at its upper side, and is adapted to be acted upon to rock the bar by a downwardly-projecting part $p'$, formed upon the under edge of each key-bar. The downwardly-projecting part S² of the rock-bar, adjacent to the depending arm $R^3$, is extended downwardly below the trunnion-stud and is provided at its lower end with a yoke $S^3$, the two arms $s'$ of which are arranged to act upon a laterally inward projecting stud carried by the lower end of the swinging arm, conveniently formed by extending the pivot-stud upon which the pawls R' R² are mounted inwardly. The under edge of each key-bar is cut away or recessed at each side of the projection $p'$ thereon, so as to permit the rocking bar to oscillate freely when not in engagement with said projection, and the depth of the projection or distance to which it extends below the upper edge of the rocking bar when the latter is in vertical position and the distance between the yoke-arms bear such relation to each other that when a key-bar is shifted in the proper direction (outwardly, in the position shown in Fig. 2) the rock-bar will be engaged from said projection and oscillated so as to cause one of its yoke-arms to shift the pawls, and thereby feed the roller forward a step, and thereafter, owing to the arc-shaped path in which the upper edge of the rock-bar moves, pass over the latter. As soon as the projection has passed over the edge of the rocking bar the latter will oscillate by gravity back to a vertical position by reason of its heavier lower part. Obviously when the next key-bar is pulled out the rocking bar will be again oscillated; but inasmuch as the pawls have been retracted the rock-bar will oscillate idly without acting thereon. When, however, a key-bar is moved in an opposite direction, the rocking bar will be engaged by the rearmost shoulder of the key and oscillate in the opposite direction, whereupon the rearmost arm of the yoke will act upon the pawls to shift them forward, thereby rotating the feed-wheel another step, and these operations will be repeated each time an alternate movement is made in the key-bars, but at no other time.

Mechanism for automatically taking an impression from the date-wheel upon each forward movement of the recording-sheet is provided as follows:

An impressing-plunger $Q^3$, in all respects similar to those hereinbefore described, with the exception that the overhanging arm is omitted, is mounted vertically above the date-wheel, so as to act upon the latter. To the side frame member B, at a point laterally opposite said plunger $Q^3$, is pivotally attached the lower end of a pair of toggle-links T T'. The upper end of the upper link is attached to the plunger at such a point as to hold the said toggle partially flexed when the plunger is in its normal position, the arrangement of the several pivotal connections being such that the plane of flexure of the said toggle is parallel with the plane of movement of the yoke $S^3$.

$T^2$ designates an arm pivotally connected at one end with the yoke $S^3$ and provided at its opposite end with a longitudinally-extending slot $t$, which is engaged with a stud $t'$ upon the lower part of the lower toggle-link. The length and position of said slot are such that when the yoke is oscillated to move the pawls one or the other of the ends of the slot will act on the toggle to flex the latter into and slightly beyond a direct line extending between the two points of attachment of the toggle ends or past the "dead-center." Obviously as soon as the toggle is flexed past the center the spring, acting on the plunger, will depress the latter instantly, thereby producing an impression. It may be noted in this connection that each of the plungers is so arranged as to rebound slightly after making the impression upon the recording-sheet, so as to leave the latter free to move.

To now describe the construction and arrangement of the inking-ribbon and mechanism for actuating the same, referring to Fig. 4, U U' designate winding-rolls mounted in suitable bearings in the side frame members B, conveniently and as herein shown at points axially beneath the type-wheel shaft C, and having their axes arranged to extend horizontally and longitudinally of the machine.

In order that the said rolls may not interfere with the outer sheet-metal casing, their axes are located some distance within the inner plane of the side frame members, the journal-bearings being to this end formed in suitable bracket-lugs $u$ $u$. One of the rolls—in this instance the roll U—is simply an idle-roll, upon which the ribbon V will be rolled before the roller is placed in position in its journals and from which the inking-ribbon will be paid out step by step across the series of printing devices and onto the other roll U', which latter is actuated as hereinafter described. From the roll U the inking-ribbon passes outwardly around a guide-roller $u'$, thence over a second guide-roller $u^2$, the upper periphery of which is arranged in the same plane with the printing-surfaces, and thence transversely across the printing devices, between the latter and the recording-sheet. At the opposite side of the machine the ribbon passes over a similar pair of guide-rollers $u^3$ $u^4$ and to the winding-drum U'.

Referring now to Fig. 3, $U^2$ designates an L-shaped lever pivotally connected at the end of its shorter horizontal arm $u^5$ to a depending part of the side frame B, at the outer side thereof. The part of the lever adjacent to the angle thereof is deflected inwardly through an opening in the skeleton frame member, so as to extend beneath the ratchet-wheel of the feed-roll, and is provided with an oblique shoulder or heel $u^6$, which is adapted to fit within and is acted upon by the notches of said ratchet-wheel R, so as to oscillate said lever as the wheel is rotated. The longer depending arm of the bent lever is provided at its lower end with a right-angled bent portion $u^7$, forming a pawl, which is arranged to engage and act upon a ratchet-wheel $U^3$, mounted upon the end of the winding-drum shaft, the arrangement being such that as the lever is oscillated by means of the feed-roller ratchet the pawl acts to rotate the winding-drum step by step. In order to hold the bent lever in engagement with the feed-roller ratchet, a coiled spring V' is shown as attached at one end to said lever, near the angle thereof, and at its opposite end to a suitable stud upon a superjacent part of the side frame, and in order to hold the pawl end of the lever in yielding engagement with the winding-drum ratchet a blade-spring $u^8$ is shown as secured to the outer surface of the side frame and arranged to bear at its free end laterally against the said lever.

Figures 8, 9:
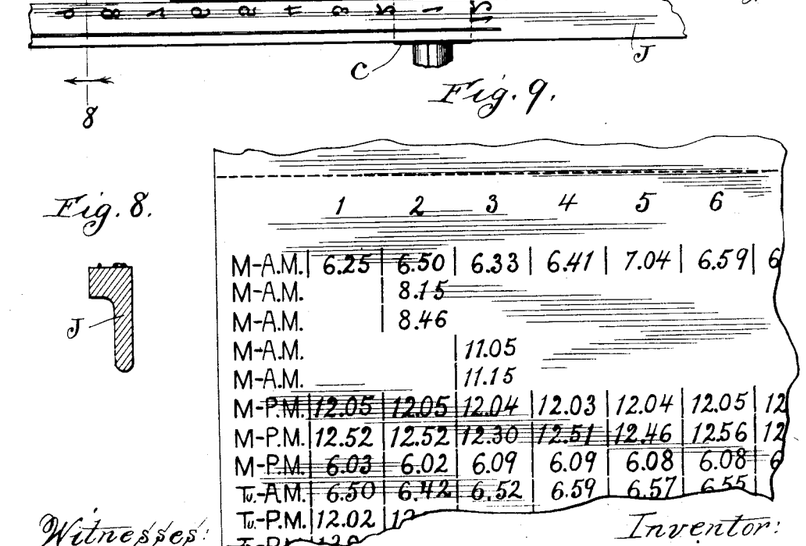
Fig. 8 is a transverse vertical section taken on line 8 8 of Fig. 7.
Fig. 9 is a fragmentary view of a portion of the recording-sheet produced by the machine.

The operation of the machine may be briefly described as follows: The machine having been properly set and connected with the clock so as to present the correct time of day and day of the week at the printing-points, each workman is allotted an individual key. In practice each key will preferably be provided with a numeral or identification mark, and correspondingly the head of the recording-sheet will be printed or otherwise provided with numerals corresponding to those of the keys, printed in such position as to be in longitudinal alinement with the columns thereafter produced upon the recording-sheet. The operation of the machine will be best understood by giving an example, accompanied by reference to Fig. 9, wherein a fragmentary part of the record is shown. Assuming that the time at which the first workman commences work is Monday at 6.25 a. m., he proceeds to the machine and taking hold of his individual key—for instance, the first one at the left-hand side of the machine—he pushes it inward as far as it will go and goes on to his work. The inward movement of the key-bar carries the projection upon its lower side into engagement with the rock-bar and oscillates the latter so as to feed forward the recording-sheet a step. Simultaneously with the feeding forward of the recording-sheet the impressing-plunger of the date-wheel will be raised and allowed to drop by means of the toggle actuated from the swinging yoke-arm of the rock-bar, thus recording the proper day of the week and the part of the day at the extreme left-hand side of the recording-sheet. By the same inward movement of the key-bar the impressing-plunger belonging to that particular operating-key will be lifted by means of the cam-block thereon and allowed to drop, thereby recording the hour and minute of the day at which the record made in the individual's vertical column and at a point transversely opposite the date-record heretofore referred to. Simultaneously with the forward movement of the recording-sheet the inking-ribbon will be moved along a step through the medium of its lever and ratchet actuating mechanism, which receives motion from the feed-roll ratchet. Assuming that the next workman comes in at the hour of 6.33 a. m., (see column 3,) he will also proceed to his individual key and push it inward. The inward movement of his key-bar will have the effect of raising the impressing-plunger of his set of recording devices and making an impression upon the sheet in his individual column of whatever characters are presented at the printing-point at this moment—in the present instance the characters "6.33." Inasmuch, however, as the sheet-feeding ratchets have been thrown forward by the last preceding key-bar, the rock-bar will in this instance simply be oscillated idly without moving the recording-sheet and the record will therefore appear transversely opposite the preceding record. Obviously so long as the workmen continue to come in these operations will be repeated without changing the position of the recording-sheet, it being understood that the minute-wheels are meantime being rotated step by step at the end of each minute and that at the end of each hour the gang of type-bars will be moved forward a step, so as to bring the succeeding hour characters into printing position. Whenever the first workman goes out, he will proceed to his key and pull it out, thus returning it to its original position. Assuming that workman No. 2 has obtained permission to leave the shop for a few minutes, upon passing out he will pull out his key, whereupon the outward movement of the key-bar will oscillate the rock-bar in a direction opposite that produced by the inward movement of the key, thereby drawing the feed-roller pawls backward and again feeding the recording-sheet forward a step. At the same time the reversible cam-block will in the outward movement of the key-bar engage the impressing-plunger and be tilted over in the position shown in full lines in Fig. 2, and thereafter by the further outward movement of the key-bar raise said impressing-plunger and allow it to drop, thus recording the characters "8.15" in the workman's individual column. Inasmuch as the sheet-feeding mechanism is actuated by this movement, the dating devices will also be actuated and the characters "M." and "A. M." will be repeated on the margin of the sheet transversely opposite the record "8.15." Upon the return of this workman the recording-sheet will be again moved by the movement of the key in an opposite direction and the record "8.46" produced. At the end of the twelfth hour, or, in other words, at twelve o'clock m., when the snail-cam completes its twelfth revolution and the set of type-bars are moved forward the twelfth time the presser-bar will be engaged by the rear tappet-stud and the pawl and detent thereby thrown off before the type-bars have moved forwardly sufficient for the detent to catch the succeeding notch, so that the twelfth movement will be a partial forward movement and then a full return or running back of the set of type-bars to the initial position, or, in other words, back to twelve o'clock. Simultaneously with the last forward movement of the set of type-bars the foremost tappet-stud carried by the latter will engage the oscillatory lever of the dating mechanism and move the date-wheel forward a step, so as to change the characters presented at the printing-point from "A. M." to "P. M.," the characters corresponding to the day of the week being simply repeated at this printing-point. Similarly at the end of the next twelve hours the date-wheel will be again changed or moved forward a step, thereby changing the characters back to "A. M.," but in this instance bringing forward the characters designating the succeeding day of the week.

Whenever the proper authorized person desires to inspect the recording-sheet, he will unlock and open the front door, thereby obtaining access to the printed forward end of the recording-sheet, which will be coiled in the vacant space in the front part of the casing. If he wishes to remove that part of the sheet printed, he will simply draw the sheet forward until the end of the printed part has passed from between the feed-rollers and thereafter sever the record, thus leaving the machine in readiness for further recording. Preferably the web or roll of paper will be provided with transverse scores at uniform distances apart, so that the sheets may be torn off of uniform size.

I claim as my invention—

1. In a time-recorder, the combination of a set of revoluble printing devices and a set of reciprocatory printing devices, clock-controlled mechanism operating to move said sets past a printing-point but at a different rate of speed and independent manually-operable means for taking impressions of the combinations of characters presented at the printing-point by each pair of printing devices.

2. In a time-recorder, the combination of a set of revoluble printing devices and a set of reciprocatory printing devices, clock-controlled mechanism operating to move said sets past a determined printing-point side by side at different rates of speed and with their printing-surfaces in substantially the same plane and means independently operable for taking impressions of the combinations of characters of each pair of printing devices thus presented at the printing-point.

3. In a time-recorder, the combination of a plurality of parallel connected type-bars arranged with intervening spaces between each adjacent two and mounted to reciprocate longitudinally, a set of type-wheels revolubly mounted on axes arranged at right angles to the direction of movement of the type-bars and each wheel located adjacent to the side of one of said type-bars and having its peripheral printing-surface located approximately in the same plane with the printing-surface of the type-bars, clock mechanism for controlling the movement of said type members and means for taking an impression from the same.

4. In a time-recorder, the combination of a plurality of parallel type-bars mounted to reciprocate longitudinally, mechanism for actuating said type-bars, mechanism for automatically releasing and returning the type-bars to the starting-point at the end of a determined run, and means for taking an impression from the type-bars.

5. In a time-recorder, the combination of a plurality of parallel type-bars mounted to reciprocate longitudinally, mechanism for actuating said bars, mechanism for automatically releasing and returning the bars to the starting-point at the end of a determined run, a plurality of type-wheels revolubly mounted adjacent to the type-bars, mechanism for actuating said type-wheels at a rate of speed different from that of the type-bars, and mechanism for taking impressions of the combinations thus produced at a determined printing-point.

6. In a time-recorder, the combination of a plurality of parallel type-bars mounted to reciprocate longitudinally, clock-controlled ratchet mechanism for actuating the type-bars step by step, means for automatically releasing the ratchet mechanism, a weight for returning the bars to the starting-point and mechanism for taking impressions from the type-bars.

7. In a time-recorder, the combination of a plurality of parallel type-bars mounted to reciprocate longitudinally, clock-controlled ratchet mechanism for actuating the type-bars step by step comprising holding and push pawls, means for simultaneously releasing both pawls, a weight for returning the bars to the starting-point, means for holding the ratchet mechanism free from the bars during the return movement of the latter comprising a presser-bar movably mounted adjacent to the pawls and adapted to act on the latter, a spring arranged to act upon the presser-bar and means for holding the presser-bar from movement under the action of the spring releasable by the forward movement of the type-bars, and means for taking impressions from the type-bars.

8. In a time-recorder, the combination of a plurality of type-bars mounted to reciprocate longitudinally, clock-controlled ratchet mechanism for actuating the type-bars step by step, means for automatically releasing the ratchet mechanism, a weight for returning the bars to the starting-point, a plurality of type-wheels each revolubly mounted adjacent to one of the type-bars and having its peripheral printing-surface located approximately in the same plane with the printing-surface of the type-bar, mechanism for actuating said type-wheels at a speed differing from that of the type-bars, and mechanism for taking impressions of the combinations thereby produced at a determined printing-point.

9. In a time-recorder, the combination of a plurality of type-bars mounted to reciprocate longitudinally, a motor for actuating the type-bars step by step, means for automatically releasing the type-bars at the end of a determined run and returning the latter to the starting-point, a plurality of type-wheels each revolubly mounted adjacent to one of the type-bars and having its peripheral printing-surface located approximately in the same plane with the printing-surface of the type-bars, driving connections from the motor for actuating said type-wheels at a rate of speed different from that of the type-bars, a clock arranged to control the movement of the motor, and mechanism for taking impressions of the combinations thereby produced at a determined printing-point.

10. In a time-recorder, the combination of a plurality of reciprocatory printing devices, clock-controlled mechanism for actuating said printing devices, means for automatically returning the printing devices to the starting-point, a date-wheel and operative connections between the reciprocatory printing devices and said date-wheel, whereby the latter is actuated once for each cycle of the reciprocatory printing devices.

11. In a time-recorder, the combination of a plurality of type-bars mounted to reciprocate longitudinally, clock-controlled ratchet mechanism for actuating said type-bars step by step, means for automatically releasing the ratchet mechanism, a weight for returning the type-bars to the starting-point, a date-wheel, operative connections between the type-bars and the date-wheel whereby the latter is moved forward a step for each cycle of the type-bars, and means for taking impressions of the type-bars and date-wheel.

12. In a time-recorder, provided with a shiftable key, the combination with an impressing-hammer and a reciprocating member operatively connected with the key of a reversible cam-block pivotally mounted upon one of said members provided with two surfaces, stops for holding the cam-block in each of its positions with one of its cam-surfaces inclined to the plane of relative movement of the other member, and an engaging part or wiper upon the part which moves relatively to the cam, adapted to coöperate with the cam-block to reciprocate the hammer when said reciprocating member is shifted in each direction.

13. In a time-recorder, the combination with a shiftable key-bar and an impressing-plunger mounted to reciprocate adjacent thereto in a direction transverse to the direction of movement of the key-bar, of a reversible cam-block pivotally mounted upon the key-bar, said cam-block having the general form in its outline of a diamond, the sides converging together to form one of its points being adapted to act as cams and its pivotal attachment being located near the opposite point of the block, stops for holding the cam-block with each of its cam-surfaces inclined to the plane of movement of the key-bar and its opposite cam-surface in a position substantially at right angles thereto, a wiper upon the plunger adapted to coöperate with the cam-block to lift the plunger when the key-bar is shifted in either direction and a spring acting on said plunger in opposition to the cam.

14. In a time-recorder provided with a plurality of shiftable keys, the combination with a sheet-feeding mechanism arranged to be operated only each time a key is shifted in a direction opposite that of the movement of the last preceding key, of a dating device and mechanism operating to take an impression from the dating devices each time only the recording-sheet is moved.

15. In a time-recorder, the combination with a vibratory member, of a sheet-feeding mechanism, of means for taking an impression each time only the sheet is fed forward a step, a spring-pressed impressing device, a toggle connected therewith and arranged to lift the impressing device when the toggle is straightened and operative connections between the vibratory member and the toggle whereby the latter will be straightened to and beyond its dead-center each time said vibratory member is reciprocated.

16. In a time-recorder, the combination with a set of reciprocatory type-bars, of mechanism for actuating said bars, comprising a ratchet-bar mounted upon the type-bars, an oscillatory lever provided at one end with an actuating-pawl adapted to act upon said ratchet, a continuously-rotating shaft, operative connections between said shaft and the oscillatory lever arranged to oscillate the latter, a weight arranged to act upon the set of type-bars in opposition to the actuating-pawl and a detent for holding the type-bars while the actuating-pawl is retracted.

17. In a time-recorder, the combination with a set of reciprocatory type-bars, of mechanism for actuating said bars, comprising a ratchet-bar mounted upon the type-bars, an oscillatory lever provided at one end with an actuating-pawl adapted to act upon said ratchet, a continuously-rotating shaft, operative connections between said shaft and the oscillatory lever arranged to oscillate the latter, a weight arranged to act upon the set of type-bars in opposition to the actuating-pawl and a detent for holding the type-bars while the actuating-pawl is retracted, and mechanism for releasing said pawls from the ratchet-bar at the end of a determined number of forward movements.

18. In a time-recorder, the combination with a set of reciprocatory type-bars, of mechanism for actuating said bars, comprising a ratchet-bar mounted upon the type-bars, an oscillatory lever provided at one end with an actuating-pawl adapted to act upon said ratchet, a wiper upon the opposite end of said lever, a rotating shaft mounted adjacent to said wiper and provided with a snail-cam adapted to act upon the latter, a spring arranged to act upon the oscillatory lever in opposition to said cam, a weight arranged to act upon the type-bars in opposition to the actuating-pawl, a detent for holding the type-bars while the actuating-bar is retracted and mechanism for throwing off the pawl and detent at the end of a determined number of forward movements of the type-bars.

19. In a time-recorder, the combination with a set of reciprocatory type-bars, of mechanism for actuating said bars, comprising a ratchet-bar mounted upon the type-bars, an oscillatory lever provided at one end with an actuating-pawl adapted to act upon said ratchet, a wiper upon the opposite end of said lever, a rotating shaft mounted adjacent to said wiper and provided with a snail-cam adapted to act upon the latter, a spring arranged to act upon the oscillatory lever in opposition to said cam, a weight arranged to act upon the type-bars in opposition to the actuating-pawl, a detent for holding the type-bars while the actuating-bar is retracted, means for throwing off the pawl and detent at the end of a determined number of forward movements of the type-bars, comprising a presser-bar movably supported adjacent to the pawl and detent and arranged to act thereon, mechanism for shifting said presser-bar laterally with relation to the plane of the ratchet-bar simultaneously with the forward movement of the type-bars so as to throw the pawl and detent out of engagement with the latter and means for holding said pawl and detent retracted during the return movement of the type-bars.

20. In a time-recorder, the combination with a printing-bar arranged to reciprocate therein, of a date-wheel rotatively mounted adjacent to said type-bar, a pawl-and-ratchet mechanism adapted to actuate said date-wheel step by step and a tappet upon the printing-bar adapted to act upon said ratchet mechanism to move the date-wheel a step upon each reciprocation of the type-bar.

21. In a time-recorder, the combination of a spring-motor, a release-shaft and a train of gears arranged to communicate motion from the motor to the release-shaft, an escapement-arm mounted upon said release-shaft, an oscillatory lever pivoted between its ends and an escapement-lever connected with each end of the oscillatory lever so as to be conversely vibrated into and out of the path of the escapement-arm, to permit a single revolution of the release-shaft upon each oscillation of said levers, and a clock operatively connected with said escapement-levers and arranged to oscillate the latter at predetermined intervals of time.

22. In a time-recorder, the combination of a revoluble printing-form, a reciprocatory printing-form, clock-controlled printing mechanism operating to move said forms automatically past a printing-point at regular but different speeds and manually-operable means for at will taking an impression from the combinations of characters thus presented at the printing-point.

In testimony that I claim the foregoing as my invention I affix my signature, in the presence of two witnesses, this 11th day of September, A. D. 1896.

JOHN W. DEÜBNER.

Witnesses:
ALBERT H. GRAVES,
JOSEPH G. PARKINSON.